United States Patent

[11] 3,628,386

| [72] | Inventor | Josef Blum<br>Norwalk, Conn. |
|------|----------|------------------------------|
| [21] | Appl. No. | 16,814 |
| [22] | Filed | Mar. 5, 1970 |
| [45] | Patented | Dec. 21, 1971 |
| [73] | Assignee | Ivan Sorvall, Inc.<br>Newton, Conn. |

[54] MICROMETER STAGE ADVANCE DEVICE FOR SCIENTIFIC INSTRUMENTS OR THE LIKE
14 Claims, 9 Drawing Figs.

[52] U.S. Cl. .................................................. 74/89.15, 33/164
[51] Int. Cl. .................................................. F16h 27/02
[50] Field of Search .................................................. 74/89.15, 424.8; 33/163, 164, 166, 170

[56] References Cited
UNITED STATES PATENTS

| 3,402,613 | 9/1968 | Neusel et al. | 74/89.15 |
| 3,078,582 | 2/1963 | Bechler | 33/170 |
| 3,469,320 | 9/1969 | Nishikata | 33/166 |
| 2,338,271 | 1/1944 | Ulanet | 74/89.15 |
| 2,932,898 | 4/1960 | Enders | 33/164 |

*Primary Examiner*—William F. O'Dea
*Assistant Examiner*—Wesley S. Ratliff, Jr.
*Attorney*—I. Jordan Kunik ABSTRACT: A micrometer for adjusting the position of a movable stage in a microtome or the like having both coarse and fine adjustment means. The fine adjustment means is operative throughout the whole range of movement controlled by the coarse adjustment means.

INVENTOR
JOSEF BLUM
BY
I. Jordan Kunik
ATTORNEY

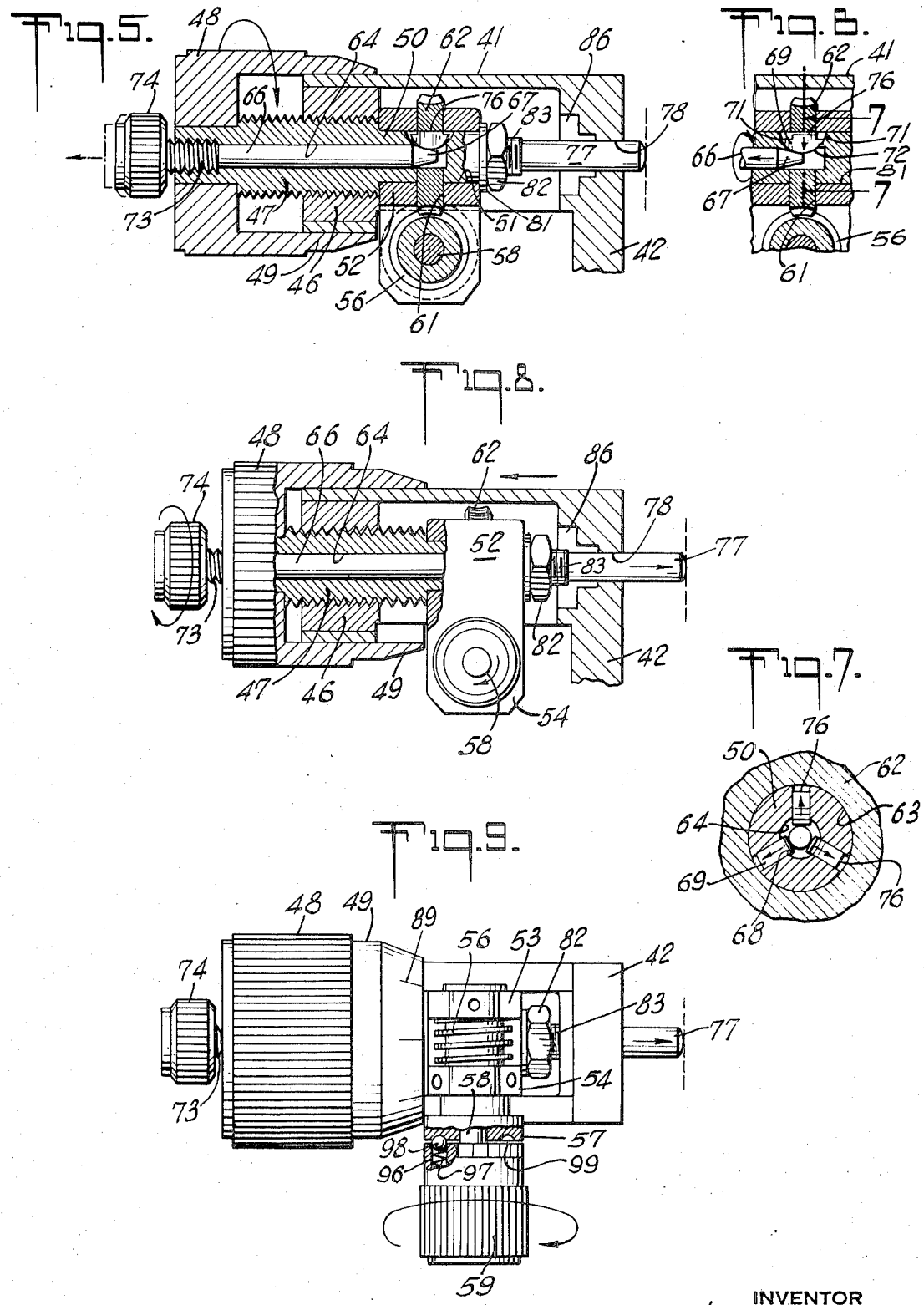

MICROMETER STAGE ADVANCE DEVICE FOR SCIENTIFIC INSTRUMENTS OR THE LIKE

BACKGROUND OF THE INVENTION

1. Field of the Invention

This invention relates to micrometer adjustment mechanisms for movable microtome or microscope stages or the like, and more particularly to a micrometer adjustment device wherein the setting of the coarse adjustment does not delimit the range of motion operable by the fine adjustment means of the micrometer.

2. Description of the Prior Art

Applicant is aware of the following United States patents relating to the subject matter of the present invention: U.S. Pat. Nos. 2,325,238; 2,489,487; 2,563,702; 2,705,374; 2,829,439; 3,077,806; 3,103,827 and 3,293,972.

In those patents where micrometer adjustment devices are utilized, the coarse and fine adjustment means are interdependent to the extent that the setting of the coarse adjustment establishes a narrow range of movement relative to said coarse adjustment within which the fine adjustment is operable. In the prior art devices, the fine adjustment means works only between extremely limited distances within a permissible range established by the locking of the coarse adjustment component. Therefore, when such limits are reached, it is necessary to reset the coarse adjustment in order to establish a new limited range of linear distance within which the fine adjustment component is operable. This entails time-consuming repetition of adjustment operations which reduces the efficiency of the apparatus particularly when speed is of the essence in obtaining microtome specimens for microscopic study and analysis.

SUMMARY OF THE INVENTION

The present invention obviates the disadvantages and severe limitations of the prior art devices by providing for a micrometer setting device wherein the coarse adjustment may be set at a particular location whereupon it is locked and thereafter the fine adjustment device can be manipulated without any restriction as to the distance within which the control element may be moved relative to the coarse setting. This is accomplished by providing for the control rod, which moves the microtome stage, to be threadably set at a coarse adjustment by a coarse setting knob. Means are mounted on the shaft of the control rod and releaseably engageable with the fine feed mechanism whereby said means can be caused to lock the control rod to the fine feed adjustment means, after which the fine feed mechanism is capable of advancing and retracting the control rod for its complete range of rectilinear movement. Thus, the operator of the apparatus can advance or retract the instrument stage by the fine adjustment means without the necessity of intermittently resorting to the coarse feed mechanism to reestablish a range of traversing operation for the fine feed mechanism.

The foregoing is accomplished by providing a novel key locking mechanism comprising a locking spindle having a tapered projection which cooperates with a plurality of radially extending keys that cooperate with a worm gear to releaseably lock the latter onto the control rod. Thereafter, the worm gear is rotated by a fine worm screw for effecting the fine feed adjustment. When the worm gear is locked upon the control rod, the fine feed worm screw is able to rotate said rod for the full rectilinear traverse through which the rod is capable of moving.

These and other novel features and advantages of the present invention will be described and defined in the following specification and claims.

BRIEF DESCRIPTION OF THE DRAWINGS

FIG. 5 is a section view taken on line 5—5 of FIG. 4, some parts being shown in elevation and some parts in dotted outline, showing the locking spindle in its locking position;

FIG. 6 is a fragmentary portion of FIG. 5 showing the spindle of the locking element in the retracted position;

FIG. 7 is a view taken on line 7—7 of FIG. 6;

FIG. 8 is a view similar to FIG. 5 wherein the control rod of the micrometer device has been advanced by the coarse adjustment component; and FIG. 9 is a bottom view of the device as shown in FIG. 8 with a portion broken away to illustrate a ball detent mechanism.

DESCRIPTION OF THE PREFERRED EMBODIMENT

Figure 1:
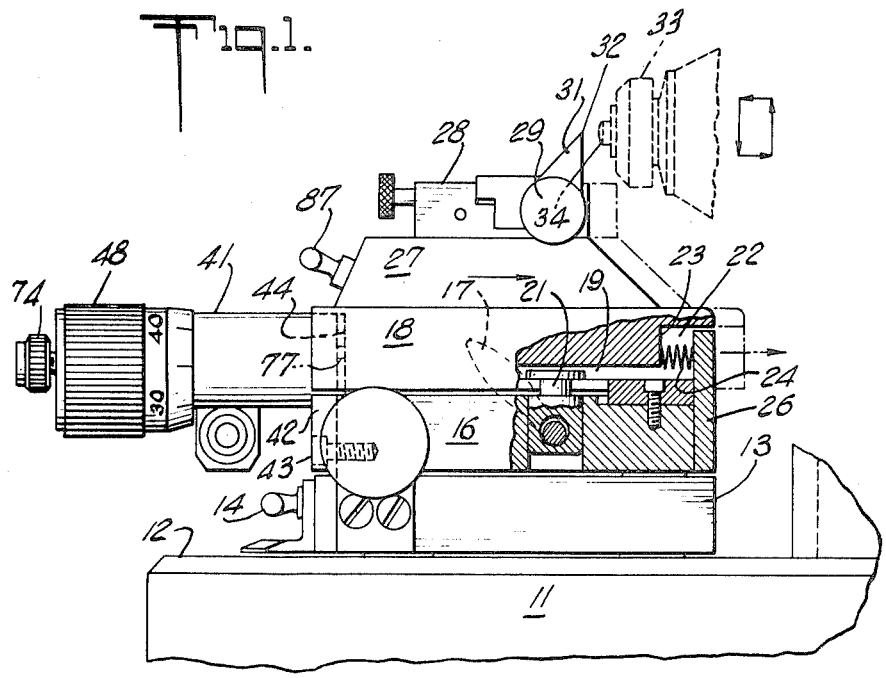
FIG. 1 is a fragmentary side elevation of a microtome apparatus or the like, partly in section and partly in dotted outline, showing the micrometer stage adjustment device of the present invention.
Figures 2, 3:
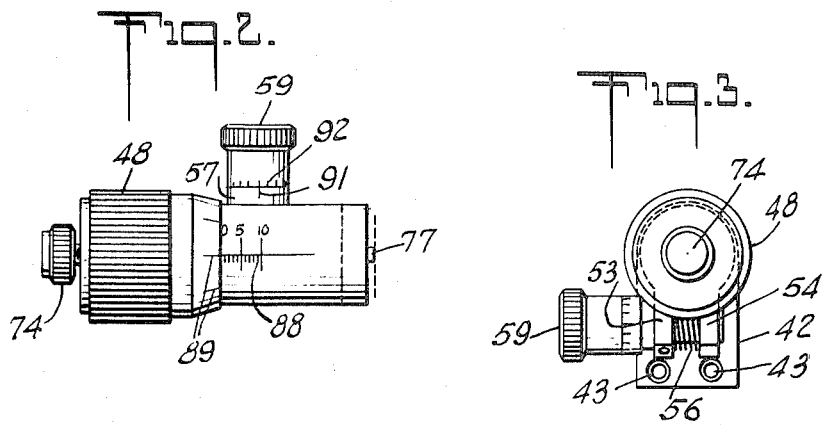
FIG. 2 is a top plan view of the micrometer device alone.
FIG. 3 is a left end view of the device shown in FIG. 2.

Referring now to the drawings in detail, the device of the present invention is mounted upon a base 11 of a microtome apparatus or the like, as for example in J. Blum, U.S. Pat. Nos. 2,822,726 and 2,918,334. Mounted on a horizontal surface 12 of base 11 is a block 13 which is movable longitudinally relative to said base but which is normally locked in position by suitable mechanisms well known in the art by the action of a lock handle 14. A second block 16 is mounted slidably on block 13 and is movable longitudinally in respect of block 13 and may be locked in position thereon by manipulation of lock handle 17. Blocks 13 and 16 are preliminarily adjusted by the operator in a suitable location and locked in position on base 11 by manipulating handles 14 and 17. Movable slidably on the top surface of block 16 is a rectangular stage 18 which has a longitudinal T-shaped slot 19 which cooperates with a stud 21 connected to block 16 for proper longitudinal tracking of stage 18 relative to block 16.

The forward central end portion of stage 18 has a recess 22 whose inner wall 23 accommodates one end of a spring 24, the other end of which abuts a vertical stop element or bar 26 connected to block 16 and extending upwardly into recess 22. The upper end of bar 26 is spaced apart from the roof surface of recess 22 so that stage 18 can move freely relative to the top edge of said bar. Spring 24 normally urges stage 18 rearwardly and yields against the forward motion of said stage relative to block 16. Stage 18 has an integrally formed, upwardly extending boss 27 on top of which is mounted a bracket 28 which supports a holder 29 for microtome knife 31, the apex or cutting edge 32 of which serves as a specimen cutter. Knife holder 29 may be adjusted in the manner well known in the art to bring the cutting edge 32 of knife 31 into a proper specimen-cutting position and to lock it in place.

Illustrated in dotted outline in FIG. 1 is a specimen holder 33 mounted on the end of a pivoting arm as exemplified in the J. Blum United States patents referred to hereinbefore. Mounted in the forward end of specimen holder 33 is a biological specimen 34 or the like which is moved relative to the cutting edge 32 of knife 31 for cutting slices therefrom for analytical and clinical research and analysis. The pattern of movement of the specimen relative to the cutting knife is diagrammatically shown in the rectangular representation of arrows in FIG. 1 where the cutting stroke is represented by the left hand arrow pointing downwards and the bypass strokes of said cutting arm are represented by the remaining three arrows. As described in Blum U.S. Pat. No. 2,822,726, and in other prior art mechanisms, the specimen 34 is cut by the knife during each downward motion of specimen holder 33 to form a thin slice of the specimen, after which the specimen arm 33 is first retracted or bypassed during its lateral and upward motions and then advanced incrementally with specimen 34 a minute distance so that during the next downward pass of said specimen a subsequent thin slice of the specimen will be cut by knife 31.

Before the cutting operation of the microtome is started, it is necessary to locate the apex 32 of knife 31 in close proximity to the location of the outer end of specimen 34 and this requires the fine adjustment of stage 18 relative to block 16. In order to accomplish such an adjustment, there is mounted a micrometer screw housing 41 upon block 16 by means of an integrally formed, downwardly extending bracket 42 which is connected to said block by means of a pair of laterally spaced apart bolts 43 or the like. Stage 18 has a rear central recess 44 whereby said stage may be movable longitudinally in respect of the forward end portion of housing 41.

Figure 4:
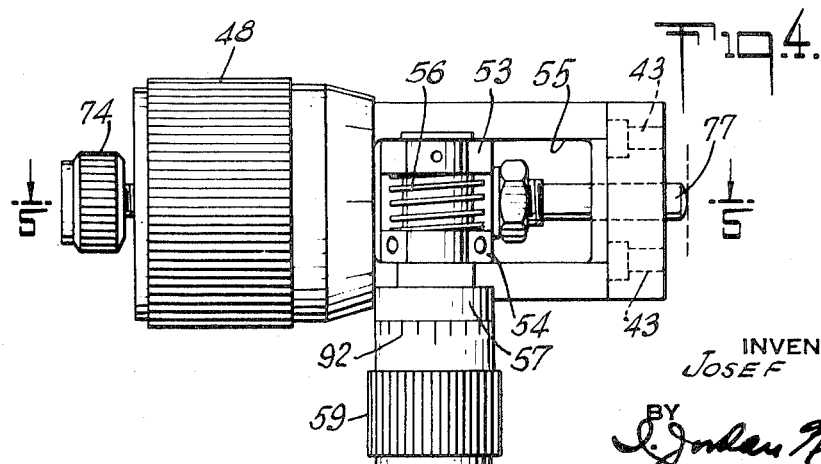
FIG. 4 is an enlarged bottom view of the device shown in FIG. 2, with some parts in different proportions.

Mounted fast in the rear end of cylindrical micrometer screw housing 41 is a bushing 46 which is axially threaded to cooperate with an elongated threaded coarse feed micrometer screw 47. See FIG. 5. Mounted fast on the rear end of a micrometer screw 47 is a coarse feed adjustment knob 48 which has a forwardly extending cylindrical flange 49 which is freely movable over housing 41. Screw 47 has a forwardly extending, integrally formed, somewhat narrowed stub portion 50 which rotates within an aperture 51 of microfeed housing 52. Microfeed housing 52 has a pair of integrally formed, spaced apart brackets 53 and 54 which extend downwardly through aperture 55 in the bottom of housing 41. See FIGS. 4 and 9. Said brackets 53 and 54 support between them a rotatable worm screw 56.

Mounted fast on the outer surface of bracket 54 is a journal member 57 through which the laterally extending shaft 58 of worm screw 56 rotatably extends. Mounted on the outer end of shaft 58 is a rotatable microfeed knob 59 which is operated manually to rotate worm screw 56.

The upper portion of microfeed housing 52 has a vertical slot 61 within which freely rotates a worm gear 62 whose peripheral teeth are engaged by the threads of worm screw 56. Worm gear 62 has a central aperture 63 whose diameter is slightly greater than the diameter of stub portion 50 of screw 47 so that said gear may normally rotate freely around said stub portion.

Screw 47 and stub portion 50 have a common axial aperture 64 which slidably accommodates a lockpin 66 whose inner end portion 67 is formed in the shape of a truncated cone which extends into the central aperture area of worm gear 62. Stub 50 has a plurality of radially extending slots 68, each of which slidably accommodate a key 69. See FIGS. 5, 6 and 7. The sidewalls of each slot 68 are substantially parallel to each other while two spaced arcuate inner walls 71 accommodate the curved inner edge 72 of the corresponding key 69 abutting said wall 71 when said keys are in their retracted positions. The outer central portion of the curved edge 72 of each key 69 may protrude into and be retracted from aperture 64 of stub 50 as will be explained hereinafter.

The rear portion 73 of lockpin 66 is threaded and engages the rear threaded portion of screw 47, extends outwardly from knob 48 and terminates in a lockpin knob 74. Depending upon the direction in which knob 74 is rotated, lockpin 66 can be projected forwardly or retracted rearwardly within aperture 64 whereby inner end 67 of said lockpin may be projected into and retracted from the axial aperture area within worm gear 62. When lockpin 66 is caused to rotate and retract within aperture 64, the cone-shaped portion 67 (inner end) of said pin is retracted from the aperture area located axially of worm gear 62 as shown in FIGS. 6 and 7 whereby keys 69 become retracted inwardly within their respective slots 68 whereby the flat outer edges 76 of said keys are retracted from the inner surface of aperture 63 of worm gear 62. Thus, should worm gear 62 be rotated by the operation of worm screw 56, said gear will rotate freely within its slot 61 without performing any function in such circumstance.

When, however, lockpin 66 is rotated by the manipulation of knob 74 to urge cone-shaped portion 67 to extend further into the central aperture area of worm gear 62, said cone-shaped portion bears against those portions of the curved inner surfaces 72 of keys 69 between spaced inner walls 71 whereby said keys are urged simultaneously outwardly within slots 68 so that their outer edges 76 bear firmly against the inner surface 63 of worm gear 62 thus locking said worm gear onto stub 50. Thereafter, rotation of microfeed knob 59 will cause the simultaneous rotation of worm gear 62 with concomitant rotation of stub 50, screw 47 and knob 48.

As illustrated in the embodiment shown in FIG. 7, three radially extending keys 69 spaced 120° apart are provided whereby the locking forces of said keys are uniformly distributed between stub 50 and worm gear 62. Suitable tolerances are maintained in the machining or forming of wedge portion 67 of pin 66 and of keys 69 whereby said keys are uniformly urged outwardly within slots 68 to assure the proper locking of said wheel to said stub. In other embodiments, more or less than three keys 69 may be utilized provided they properly perform the function described herein.

Stub 50 has a forwardly extending, integrally formed, elongated control rod 77 which moves freely longitudinally and rotatably within aperture 78 of forward wall 79 of housing 41. Microfeed housing 52 is secured in position around stub 50 by means of a washer 81 and a nut 82 threadably engaging a threaded portion 83 of control rod 77. The reciprocal movement of microfeed housing 52 is limited by the abutment of said housing at opposite ends of aperture 55 at the bottom of micrometer screw housing 41. The full forward movement of microfeed housing 52 is made possible by the provision of recess 86 in the interior surface of wall 79 to accommodate nut 82 and washer 81.

Although the preferred embodiment is illustrated in the drawings as comprising a lockpin 66 and keys 69 for securing worm gear 62 to the stub 50 of control rod 77, it is understood that other equivalent mechanical means for locking the coarse feed component to the fine feed component are contemplated within the purview of the present invention whereby the fine feed mechanism is able to move control rod 77 reciprocably within the full traverse range of the coarse feed mechanism.

OPERATION

The purpose of the micrometer stage advance device herein is to bring the cutting edge 32 of knife 31 into close proximity to the specimen 34 mounted on cutting arm 33 of the microtome or the like. It is customary to provide a first coarse adjustment means that will bring the cutting edge into a fairly close proximity, after which a second fine adjustment means is manipulated to bring the cutting edge to an extremely close proximity to the specimen. In previous devices, the fine adjustment means could be operated only within a limited range of movement after the coarse adjustment was made, and if the proper fine adjustment required movement beyond that range it was necessary to return back to the coarse adjustment means to relocate the stage in another location and thereafter manipulate the fine adjustment means again. Often, this required several alternating manipulations of the coarse and fine adjustment means on prior art devices.

The apparatus herein permits the manipulation of the fine adjustment means throughout the full range of movement of the stage controlled by the coarse adjustment means so that repeated alternating manipulations of coarse and fine adjustments are obviated.

The outer end of control rod 77 bears against the vertical wall of recess 44 on sliding stage 18 to cause the latter to move forwardly against the action of spring 24 when said spindle is rotated and moves forwardly from housing 41. When control rod 77 is retracted, spring 24 urges stage 18 rearwardly against the end of control rod 77. Accordingly, the location of the free end of control rod 77 determines the location and positioning of stage 18 and, concomitantly, of the cutting edge 32 of knife 31 in respect of the other portions of the microtome apparatus. Normally, when control rod 77 is retracted, knife 31 is sufficiently retracted from specimen 34 so that the operator can readily secure specimen 34 without hindrance upon specimen arm 33. Thereafter, it is desired to bring the cutting edge 32 of knife 31 close to specimen 34 so that it will be in a proper position for performing the specimen slicing action when the apparatus is started and specimen arm is caused to oscillate.

First, knob 74 is manipulated to retract lockpin 66 and conical portion 67 thereof from engagement with keys 69 thereby unlocking worm gear 62 from stub 50. Thereafter, coarse adjustment knob 48 is rotated to cause stub 50 and control rod 77 to rotate and to move forwardly relative to housing 41 and to cause the end of control rod 77 to urge unlocked stage 18 to move forwardly against the action of spring 24. This coarse adjustment operation is continued until the cutting edge 32 of knife 31 is fairly close to specimen 34 but not touching it, in order to avoid any damage to said specimen. Next, while knob 48 is held immobile, lock knob 74 is rotated to cause the conical end portion 67 of lockpin 66 to be urged against the inner curved surfaces 72 of keys 69 whereby the latter are urged outwardly within slots 68 to cause the outer flat portions 76 of said keys firmly to engage the inner surface 63 of worm gear 62. By this action, knob 48, screw 47, stub 50, control rod 77 and worm gear 62, are formed into a unitary rotating element.

For fine adjustment, in order to bring the cutting edge 32 of knife 31 into extremely close proximity to specimen 34, fine adjustment knob 59 is then rotated to cause screw 56 to rotate worm gear 62 which, in turn, rotates the complete assembly of knob 48, screw 47, and control rod 77 in unison. The interengaging screw threads 56 and the teeth of gear 62 are arranged to provide a considerably smaller microfeed movement of control rod 77 as compared with the coarse-feed movement provided by the interengaging threads of screw 47 and bushing 46. The operation of the fine- or microadjustment knob 59 is not limited in either forward or retracting direction and can perform its adjustment function throughout the whole traverse through which control rod 77 can move by manipulation of coarse adjustment knob 48, and is only limited by the abutment at opposite ends of said traverse of microfeed housing 52 abutting the opposite ends of aperture 55 in housing 41.

After the operations of manipulating microfeed or coarse adjustment knob 48 and then microfeed knob 59 to cause control rod 77 to urge stage 18 forwardly against the action of spring 24 to bring the cutting edge 32 of knife 31 in the proper position adjacent specimen 34 when it is at rest in holder 33, then handle 87 on boss 27 of stage 18 is manipulated to lock said stage firmly in position upon block 16 whereby said stage is rendered immobile on base 11 of the apparatus. Thereafter, the microtome apparatus is ready for operation and specimen 34 is then moved repeatedly past cutting edge 32 of knife 31 to produce the thin specimen slices for subsequent microscope study and analysis.

Engraved or otherwise applied on the top surface of housing 41 is a scale 88, while index lines 89 are engraved or otherwise applied in radial array on flange 49 of knob 48, whereby visual means are provided for adjusting said knob in suitable or desired gradations relative to said housing for initially setting the coarse adjustment of stage 18. Also, a suitable index line 91 may be engraved or otherwise applied on the surface of journal 57 for cooperating with spaced-apart gradation or scale lines 92 engraved or otherwise applied upon the barrel of knob 59 whereby the fine adjustment of stage 18 may be visually determined by the operator of the apparatus. In one embodiment, the ratio of turns of knob 59 to knob 48 is 50:1. Other suitable turn ratios may be provided in other embodiments as may be desired or required.

While manipulating microfeed knob 59, it may be desirable for the operator to maintain a continuous visual surveillance of cutting edge 32 of knife 31 as it approaches the specimen 34 without being diverted intermittently to inspect the movement of scale lines 92 relative to index line 91. Accordingly, in one embodiment as shown in FIG. 9, there is provided in knob 59 a longitudinal recess 96 in which is nested a spring 97 and a small detent ball 98 yieldably urged by said spring into any one of a plurality of circumferentially spaced apart detenet recesses 99 located in the end of journal 57. Detent recesses 99 may be equal in number to, and aligned with each of, scale lines 92 whereby the manual rotation of knob 59 will provide a click stop tactile signal to the operator who can thereby "count by feel" the minute increments of rotation of said knob while keeping his eyes continuously focused upon the specimen and the knife during the critical and painstaking step of brining the latter into the proper cutting position. Additionally, the microfeed knob may be used by the operator for obtaining occasional thicker sections during a sequence of thin sections corresponding to the preset thickness setting of the instrument.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claims.

I claim:

1. Adjustment apparatus for scientific instruments comprising a base, a stage movable on said base, a control housing mounted on said base, a control rod in said housing movable relative thereto and operative on said stage, coarse adjustment means on said housing for moving said control rod reciprocably within a predetermined spatial range, fine adjustment means in said control housing, means on said coarse adjustment means for interlocking said fine adjustment means to said coarse adjustment means, said fine adjustment means being operative to move the assembly of said interlocked coarse adjustment means and said control rod within the entire spatial range of said coarse adjustment means, said coarse adjustment means comprising coarse screw thread interengagement between said control rod and said housing, said interlocking means comprising a worm gear normally freely rotatable around said control rod, and a lock element on said coarse adjustment means releaseably securing said worm gear to said control rod for simultaneous rotation of said gear and said rod, said fine adjustment means including a worm screw operative upon said worm gear for rotating the latter and said control rod in unison only when said worm gear is secured to said control rod.

2. Apparatus according to claim 1 and further comprising an axial aperture in the rear portion of said control rod, at least one radial slot in said control rod communicating with said axial aperture in the region of said worm gear, a key movable within said radial slot, and a lockpin movable reciprocably within said axial aperture, the forward movement of said lockpin causing said key to engage said worm gear to secure the latter fast upon said control rod to rotate in unison therewith, the retraction of said lockpin permitting said key to become retracted from said worm gear to permit free rotation of the latter around said control rod.

3. Apparatus according to claim 2 wherein said fine adjustment means comprises a microfeed housing mounted around said control rod, said control rod being normally freely rotatable within said microfeed housing, and a slot in said microfeed housing within which said worm gear is normally freely rotatable, said microfeed housing moving reciprocably relative to said control housing in unison with said control rod.

4. Adjustment apparatus for scientific instruments such as microtomes, microscopes, or the like, comprising a base, a stage movable on said base, a control housing mounted on said base, an elongated control rod movable rotatably on its axis and reciprocably relative to said housing and operative upon said stage for positioning the latter relative to said base, coarse screw means between said control rod and said control housing, a microfeed housing mounted around said control rod within said control housing and movable reciprocably in unison with said control rod, fine screw means on said microfeed housing normally disengaged from said coarse screw means, and locking means on said coarse screw means releaseably securing said fine screw means with said control rod for rotating the assembly of said coarse screw means and said control rod reciprocably relative to said control housing throughout the complete traverse of operation controlled by said coarse screw means, said control rod being normally rotatable within said microfeed housing when said rod is under the operation of said coarse screw means, and a worm gear in said microfeed housing normally freely rotatable around said control rod, said worm gear being rotated by means of said fine screw means, and means releaseably locking said worm gear on said control rod whereby manipulation of said fine screw means causes the rotation of said rod.

5. Apparatus according to claim 4 wherein said locking means comprises first means threadably mounted in said control rod for rectilinear motion therein, and second movable lock means in said control rod in the region of said worm gear, said second means being activated by the movement of said first means in one direction to lock said worm gear on said control rod and by the movement in the opposite direction of said first means to release said worm gear from said control rod.

6. Apparatus according to claim 5 wherein said second means comprises at least one radial slot in said control rod, a key movable within said slot, the inner end of said key being releaseably engageable by said first means to be urged against said gear wheel to secure the latter fast upon said control rod.

7. Apparatus for producing coarse and fine adjustment for a movable stage on an instrument base comprising a housing mounted on said base, a control rod mounted with coarse threading for reciprocating movement relative to said housing, the free end of said control rod engaging said stage, an axial aperture in said control rod, a lockpin threadably mounted in said aperture for rectilinear motion therein, a worm gear normally freely rotatably mounted around said control rod, at least one radially extending slot in said control rod communicating with said aperture, a key movable in said slot, said key being releaseably engaged by said lockpin for bearing upon the interior of said worm gear for releaseably locking the latter fast upon said control rod, a microfeed housing mounted around said control rod, and a fine worm screw in said microfeed housing for rotating said worm gear when the latter is mounted fast upon said control rod whereby said fine screw causes the rotation of said control rod.

8. Apparatus according to claim 7 comprising three radially extending slots in said control rod communicating with said aperture, said slots being arrayed symmetrically relative to the axis of said control rod, the engagement of said lockpin with the inner portions of each of said keys causing the outer portions thereof firmly to engage corresponding interior portions of said worm gear to secure the latter fast on said control rod 9. Apparatus according to claim 7 wherein the retraction of said lockpin permits the retraction of said keys inwardly within their respective slots thereby permitting the free rotation of said worm gear around said control rod.

10. Apparatus according to claim 7 and further comprising an axial aperture in said worm gear which communicates with the axial aperture of said control rod through said slot, the forward motion of said lockpin urging said key to move outwardly in said slot and to engage an interior portion of said worm gear, to lock the latter fast upon said control rod.

11. Apparatus according to claim 10 wherein said key has an inner curved surface, and wherein the inner portion of said slot terminates in correspondingly curved spaced apart surfaces, and wherein the inner end of said lockpin is wedge-shaped for engaging the inner curved surface of said key between said spaced-apart surfaces when said pin is moved forward in said control rod aperture to cause said key to move outwardly to engage said worm gear and secure the latter fast upon said control rod.

12. Micrometer apparatus for scientific instruments comprising a base, a stage movable on said base, a control housing mounted on said base, a control rod movable reciprocably within said housing and operative on said stage, coarse feed screw means on said control rod for moving the latter reciprocably relative to said housing, fine screw means on said control rod and normally inoperative thereon when said coarse screw means are operated, and means on said coarse screw means locking said fine screw means to said control rod, the operation of said fine screw means when locked moving the assembly of said coarse screw means and said control rod reciprocably relative to said housing throughout the complete traverse of operation controlled by said coarse screw means, said lock means being located in the interior of said control rod, and key means extending movably through said rod for releaseably engaging and securing said fine screw means to said control rod, said lock means being operative to releaseably urge said key means into a position for locking said fine screw means to said control rod, said fine screw means further comprising a worm gear normally freely rotatable around said control rod, and a worm screw for rotating said worm gear, said key means cooperating to releaseably lock said worm gear on said control rod.

13. Apparatus according to claim 12 wherein said fine screw means further comprises a rotatable knob, a plurality of spaced-apart detents in circular array on said knob, said detents providing a click stop tactile control for the operator in measuring the amount of rotation of said knob.

14. Apparatus according to claim 13 wherein said detents are equally spaced apart and further comprising a plurality of visible scale lines on said knob, each of said scale lines being aligned with a corresponding detent.

* * * * *